US012181955B1

(12) United States Patent
Lu et al.

(10) Patent No.: US 12,181,955 B1
(45) Date of Patent: Dec. 31, 2024

(54) SYSTEMS AND METHODS FOR ENABLING DEBUGGING

(71) Applicants: Advanced Micro Devices, Inc., Santa Clara, CA (US); ATI Technologies ULC, Markham (CA)

(72) Inventors: Lu Lu, Beijing (CN); Dong Zhu, Austin, TX (US); Gia Phan, Markham (CA); James A. Ott, Austin, TX (US); Nehal Patel, Santa Clara, CA (US); Zang SongGan, Shanghai (CN)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 20 days.

(21) Appl. No.: 18/087,894

(22) Filed: Dec. 23, 2022

(51) Int. Cl.
*G06F 11/07* (2006.01)
*G06F 11/34* (2006.01)
*G06F 11/36* (2006.01)

(52) U.S. Cl.
CPC ...... *G06F 11/0778* (2013.01); *G06F 11/0748* (2013.01); *G06F 11/3476* (2013.01); *G06F 11/3636* (2013.01)

(58) Field of Classification Search
CPC ............. G06F 11/0778; G06F 11/0748; G06F 11/3485; G06F 11/348; G06F 11/3476; G06F 11/3471
See application file for complete search history.

(56) References Cited

U.S. PATENT DOCUMENTS

| | | | |
|---|---|---|---|
| 2006/0168471 A1* | 7/2006 | Schulstad | G06F 11/0778 714/6.11 |
| 2013/0212425 A1* | 8/2013 | Blaine | G06F 11/3648 714/6.1 |
| 2013/0282951 A1* | 10/2013 | Kuo | G06F 11/0712 711/163 |
| 2017/0132067 A1* | 5/2017 | Singaravelu Vanaja | G06F 11/0727 |
| 2019/0114218 A1* | 4/2019 | Yun | G06F 11/0784 |
| 2019/0129774 A1* | 5/2019 | Konan | G06F 11/0778 |
| 2021/0200620 A1* | 7/2021 | Sassara | G06F 11/0727 |
| 2023/0026712 A1* | 1/2023 | Noorudheen | G06F 11/073 |
| 2023/0325275 A1* | 10/2023 | Golvalkar | G06F 11/1469 714/764 |

* cited by examiner

*Primary Examiner* — Yolanda L Wilson
(74) *Attorney, Agent, or Firm* — Greenberg Traurig, LLP (57) ABSTRACT

A computer-implemented method for enabling debugging can include receiving, at a peripheral device connected through an expansion socket to a base CPU platform, a scan dump instruction from a network computing device connected to the base CPU platform across a network connection and executing, by a System-on-Chip at the peripheral device in response to the scan dump instruction, a debugging procedure. The debugging procedure can include capturing a snapshot of memory of the peripheral device and transmitting the snapshot to the network computing device through memory addresses that have been assigned to memory-mapped input/output. Various other methods, systems, and computer-readable media are also disclosed.

20 Claims, 5 Drawing Sheets

| Pin | Side B | Side A | Description |
|---|---|---|---|
| 1 | +12 V | PRSNT1# | Must Connect To Farthest PRSNT2# Pin |
| 2 | +12 V | +12 V | Main Power Pins |
| 3 | +12 V | +12 V | |
| 4 | Ground | Ground | |
| 5 | SMCLK | TCK | |
| 6 | SMDAT | TDI | |
| 7 | Ground | TDO | SMbus And JTAG Port Pins |
| 8 | +3.3 V | TMS | |
| 9 | TRST# | +3.3 V | |
| 10 | +3.3 V aux | +3.3 V | Standby Power |
| 11 | WAKE# | PERST# | Link Reactivation; Fundamental Reset |

402

| LEGEND | |
|---|---|
| Ground Pin | Zero Volt Reference |
| Power Pin | Supplies Power to the PCIe Card |
| Card-to-host Pin | Signal from the Card to the Motherboard |
| Host-to-host Pin | Signal from the Motherboard to the Card |
| Open Drain | May be Pulled Low or Sensed by Multiple Cards |
| Sense Pin | Tied Together on Card |
| Reserved | Not Presently Used, Do not Connect |

SYSTEMS AND METHODS FOR ENABLING DEBUGGING

BACKGROUND

The present disclosure is generally directed to systems and methods for enabling debugging. Peripheral devices, such as expansion cards and hardware accelerators, can have one or more instances of a SoC (System-on-Chip), which can further enable different types of debugging functionality, including scan dump functionality that takes a snapshot of logic on the SOC. When the peripheral devices experience a failure, it can be helpful to enable a user or administrator to use one or more of these debugging mechanisms to help troubleshoot and overcome the failure. Nevertheless, some forms of these debugging mechanisms can involve problems or deficiencies that can be addressed by the technology of this application, as discussed further below.

BRIEF DESCRIPTION OF THE DRAWINGS

The accompanying drawings illustrate a number of example implementations and are a part of the specification. Together with the following description, these drawings demonstrate and explain various principles of the present disclosure.

Throughout the drawings, identical reference characters and descriptions indicate similar, but not necessarily identical, elements. While the example implementations described herein are susceptible to various modifications and alternative forms, specific implementations have been shown by way of example in the drawings and will be described in detail herein. However, the example implementations described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

A common debugging scene for many debuggers is to analyze a hanging scenario for a peripheral device, such as a PCIe ("Peripheral Component Interconnect Express") device. In such debugging situations, performing step-in debugging might not be practical or advantageous. Additionally, it can be difficult to identify a root cause of a failure or problem, especially in large and complex SoC systems.

An alternative and useful debugging method in such scenarios is the so-called "scan dump" method, which takes a "snapshot" of all the internal flip-flops' states on the SoC by triggering a clock stop event, and then to stream the flip-flop states out in a serialized manner for observation and further analysis. Nevertheless, the scan dump action (i.e., stitching and shifting of all the sequential logical components) can be disruptive to mission mode functionality and, therefore, it can be performed under a full test mode through a JTAG ("Joint Test Action Group") interface. However, the JTAG connecter is not always available, nor can the connector be readily connected out from the peripheral device under debugging, especially during a production phase. In addition, the failure related to the base Central Processing Unit ("CPU") platform sometimes leads the system to enter a soft lock or blue screen mode.

In view of the above, this application discloses technology that can enable debugging and address one or more of the deficiencies outlined above. For example, by providing a scan dump that takes a snapshot of logic states on the SoC, the technology of this application can provide a more robust and meaningful debugging mechanism than related step-in debugging (i.e., because step-in debugging can be limited to executing and analyzing one instruction at a time). Similarly, by providing an isolation wrapper around a host interface, control interface, and/or scan dump state machine, the technology of this application can avoid or overcome the problem whereby the scan dump snapshot disrupts the mission mode of the peripheral device. Furthermore, by using a memory-mapped input/output (MMIO) access method (from the CPU's point of view), the technology of this application can bypass JTAG connectors, which are not always available or cannot always be connected, especially during a production phase. Lastly, the initial failure leading to debugging can at least partially inhibit local debugging at the original base CPU platform where the peripheral device is connected, and the technology of this application can enable remote debugging, over a network, thereby enabling debugging to be performed remotely despite the local failure at the base CPU platform.

An example method includes receiving, at a peripheral device connected through an expansion socket to a base CPU platform, a scan dump instruction from a network computing device connected to the base CPU platform across a network connection and executing, by a System-on-Chip at the peripheral device in response to the scan dump instruction, a debugging procedure. In these examples, the debugging procedure includes capturing a snapshot of a logic state of the peripheral device and transmitting the snapshot to the network computing device through memory addresses that have been assigned to memory-mapped input/output.

In some examples, capturing the snapshot includes stitching flip-flops into a chain.

In some examples, an operating system at the base CPU platform has experienced a failure that at least partially inhibits performance of debugging at the base CPU platform and the debugging procedure enables remote debugging to bypass the failure at the base CPU platform.

In some examples, the expansion socket is formatted according to a high-speed serial computer expansion bus standard.

In some examples, the high-speed serial computer expansion bus standard includes the Peripheral Component Interconnect Express standard.

In some examples, usage of the addresses that have been assigned to memory-mapped input/output (MMIO) address space bypasses Joint Test Action Group port pins.

In some examples, the peripheral device remains in mission mode throughout the capturing and transmitting of the snapshot.

In some examples, the network computing device includes a remote CPU platform and the network connection includes an Ethernet connection.

In some examples, the System-on-Chip at the peripheral device performs the capturing and the transmitting in coordination with a kernel-mode debugging driver installed on the base CPU platform.

In some examples, the system-on-chip flushes, in response to the scan dump instruction, a set of pending transactions in a host interface of the peripheral device.

In some examples, a system-on-chip includes a host interface that receives a scan dump instruction from a network computing device connected to a base CPU platform across a network connection and a control interface that captures, in response to the scan dump instruction, a snapshot of memory of a peripheral device that is connected to the base CPU platform through an expansion socket. In these examples, the host interface further transmits the snapshot to the network computing device through addresses that have been assigned to memory-mapped input/output address space.

An example system includes a base CPU platform connected to a network computing device across a network connection and a peripheral device connected through an expansion socket to the base CPU platform. In these examples, the peripheral device includes a host interface configured to receive a scan dump instruction from the network computing device, the peripheral device includes a control interface configured to capture, in response to the scan dump instruction, a snapshot of memory of the peripheral device, and the host interface is further configured to transmit the snapshot to the network computing device through memory addresses that have been assigned to memory-mapped input/output.

Figure 1:
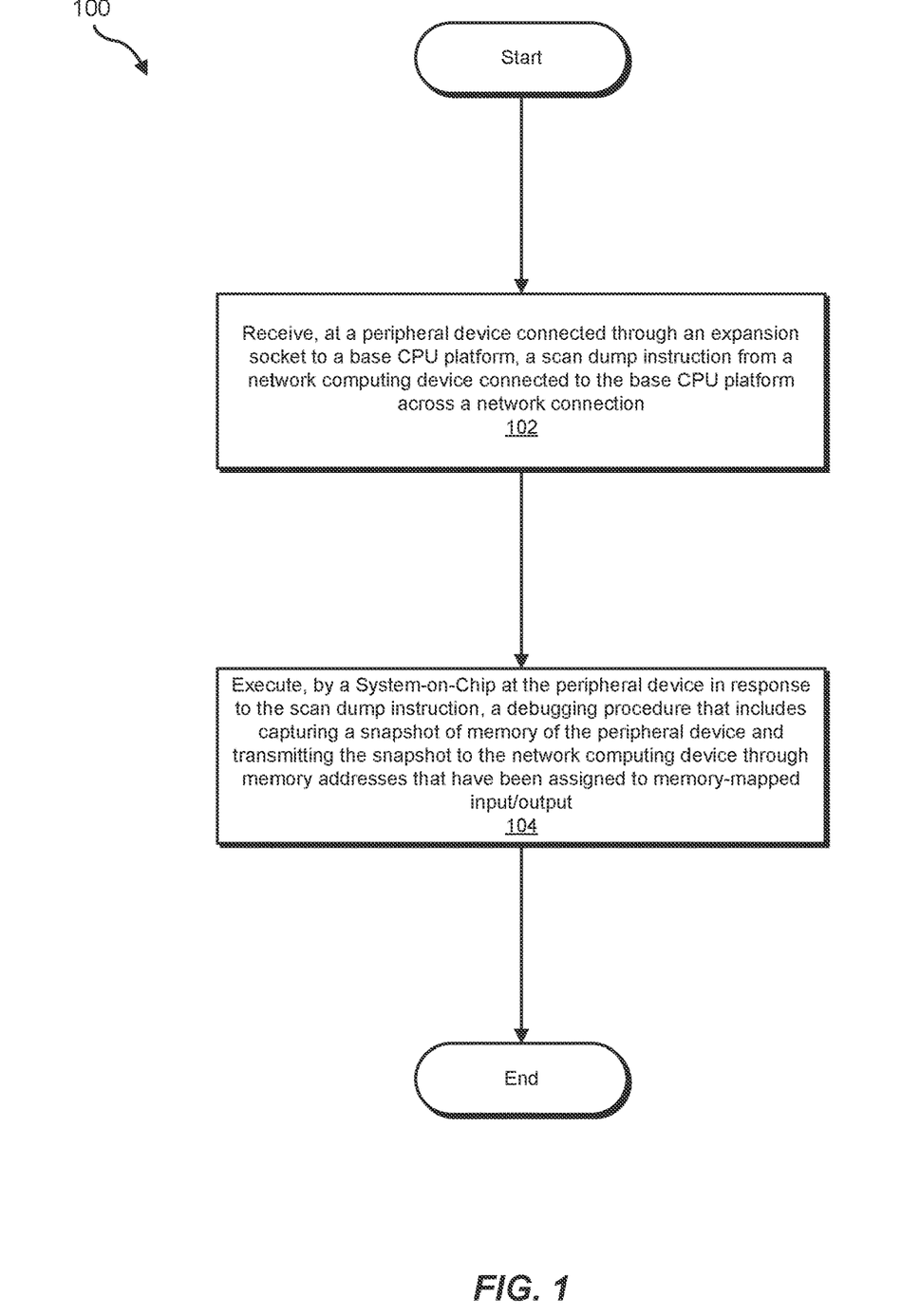
FIG. 1 shows a flow diagram of an example method for enabling debugging.

FIG. 1 shows an illustrative example of a method 100 for enabling debugging. At step 102, one or more of the systems described herein can receive, at a peripheral device connected through an expansion socket to a base CPU platform, a scan dump instruction from a network computing device connected to the base CPU platform across a network connection. For example, at step 102, a processor, such as a System-on-Chip, can perform step 102.

As used herein, a peripheral device can refer to an auxiliary device that connects with, and establishes input/output communications with, a computer, excluding core components of the computer such as a CPU or power supply. As used herein, a base CPU platform can refer to a computing device that accepts or connects a corresponding peripheral device through an expansion socket. As used herein, a scan dump instruction can refer to an instruction for a device such as a peripheral device to release or dump a set of states of internal logic states such as flip-flops. As used herein, the term network computing device can refer to a second computing device (i.e., a second computing device other than the base CPU platform and other than the peripheral device) that is connected to the base CPU platform over a network.

Step 102 can be performed in a variety of ways. Generally speaking, step 102 can be performed by a processor on a peripheral device. In some examples, the peripheral device can be connected through a corresponding expansion socket, such as a SoC on a PCIe complaint peripheral device, and receive the scan dump instruction. The scan dump instruction can be commanded or initiated by a user, administrator, and/or software or debugging component at a second CPU platform (e.g., a remote CPU platform) that is distinct from the base CPU platform yet connected to the base CPU platform over a network.

Figure 2:
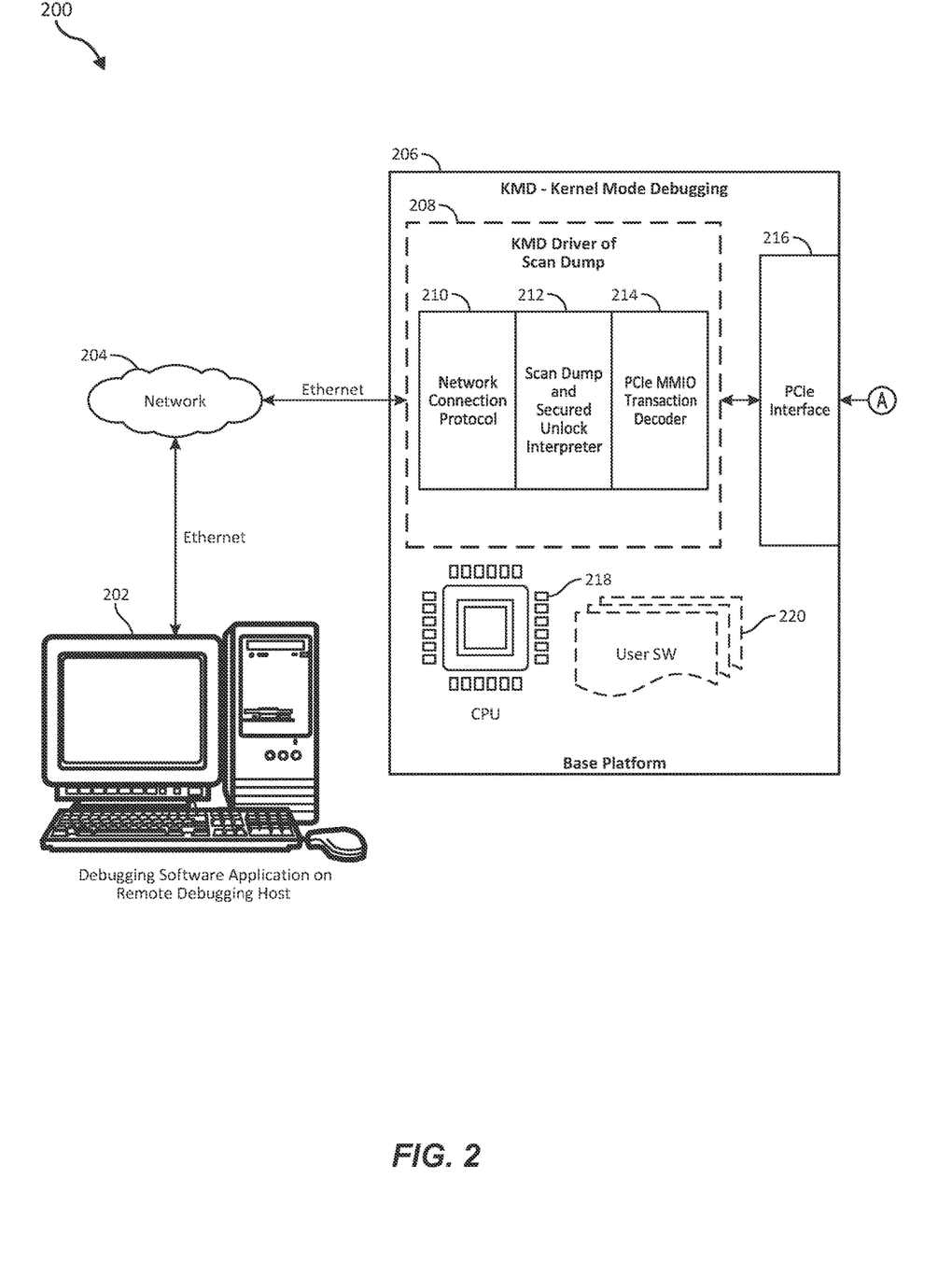
FIG. 2 shows a schematic diagram of one aspect of a detailed example system for enabling debugging.
Figure 3:
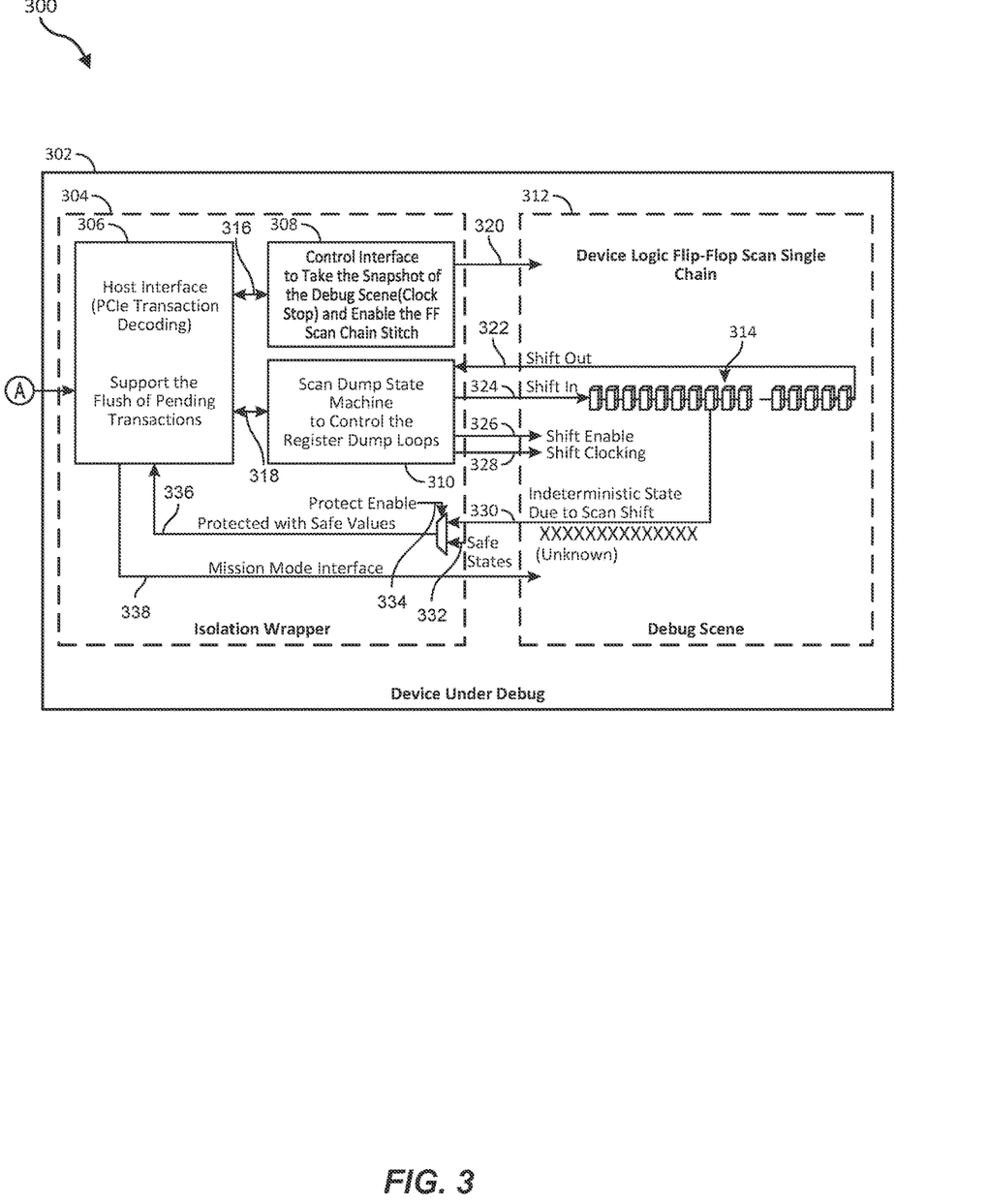
FIG. 3 shows a schematic diagram of a second aspect of the detailed example system for enabling debugging.

FIGS. 2-3, which describe detailed implementations of method 100, show an example CPU platform 202 connected over a network 204 (e.g., through an Ethernet connection) to a base CPU platform 206, which can be further connected to a peripheral device 302 (see FIG. 3) over a PCIe expansion socket (as one example of such an expansion socket). Thus, in this example, one or more components of peripheral device 302 can have experienced a failure, or been impacted by a failure, which can have been detected by an entity at base CPU platform 206. The entity can then further trigger, command, or initiate the scan dump instruction of step 102. This scan dump instruction can be received by a processor, such as a CPU or SoC at peripheral device 302. In some examples, the instruction can be received at peripheral device 302 across the network connection and across the corresponding expansion socket connection while effectively bypassing or overcoming the impact of the failure on a processor or operating system of the base CPU platform (e.g., an impact that triggers a soft lock or blue screen mode).

As described above, SoCs can be implemented on one or more peripheral devices that connect through an expansion socket to a base CPU platform (e.g., all of the components within peripheral device 302 can be disposed on a SoC). The comprehensive functionality that is provided by SoCs indicates that they can be disposed on any of a variety of types of peripheral devices, including accelerated processors or hardware accelerators, for example.

In some examples, the SoC can implement a test interface that is compliant with JTAG standards. Nevertheless, as alluded to previously, the JTAG interface cannot always provide an optimum debugging experience, because a corresponding connector might not be available or because connecting it can be impractical or inconvenient (e.g., in a large server farm environment or when dealing with customized notebook form factors).

To address one or more deficiencies associated with related methodologies, including these JTAG compliant examples, the technology of this disclosure can leverage memory locations that have been assigned to memory-mapped input/output (e.g., mapped to registers on the peripheral device) in order to communicate for debugging purposes. In some examples, the usage of the memory-mapped input/output address space from the base CPU platform can effectively bypass the usage of JTAG and the corresponding inefficiencies and disadvantages associated with the JTAG pins and connector, etc.

Returning to FIG. 1, at step 104, a SoC at the peripheral device can execute, in response to the scan dump instruction, a debugging procedure that includes capturing a snapshot of memory of the peripheral device and transmitting the snapshot to the network computing device through memory addresses that have been assigned to memory-mapped input/output. Step 104 can be performed in a variety of ways, as discussed further below.

As first discussed above, FIGS. 2-3 show a schematic diagram 200 and a schematic diagram 300 for a detailed implementation of an overall system that can facilitate the performance of method 100. As further shown in these figures, a network computing device 202 can be connected to a base CPU platform 206 over network 204. Base CPU platform 206 can further include a driver 208, such as a kernel mode debugging driver. Driver 208 can further include a component 210 for a network connection protocol, a component 212 for scan dump and secured unlock interpreter functionality, and a component 214 for performing MMIO transaction decoding. Driver 208 can interface with an expansion socket interface 216, which further connects base CPU platform 206 to peripheral device 302 of FIG. 3.

As further illustrated in this figure, and for completeness, base CPU platform 206 can also include a CPU 218 and user software 220.

Base CPU platform 206 can connect with peripheral device 302 of FIG. 3 across an expansion socket (e.g., PCIe interface) corresponding to symbol "A" on the right side of FIG. 2 and carrying into the left side of FIG. 3. As further shown in this figure, peripheral device 302 can further include an isolation wrapper 304 that wraps around a set of components for implementing method 100 in a manner that leverages a scan dump component 312 while nevertheless potentially avoiding one or more disadvantages associated with related scan dump methodologies (e.g., interference with mission mode functionality), as further discussed above.

The set of components within isolation wrapper 304 can further include a host interface 306, a control interface 308, and/or a scan dump state machine 310. Host interface 306 can perform expansion socket (e.g., PCIe) communications or transactions decoding, and host interface 306 can also support the flushing of pending transactions as part of the debugging procedures corresponding to method 100. In particular, host interface 306 can flush a set of pending transactions in the host interface that have not yet received a response. Host interface 306 can perform the flushing at least in part by dropping pending write operations and/or returning zero or null values for non-posted read operations.

Control interface 308 can implement programming steps (e.g., in logic) to take a snapshot of a debugging scene. The debugging scene can correspond to a relevant portion of the peripheral device and/or SoC, including but not limited to flip-flops, registers, etc. In some examples, control interface 308 can take or initiate the snapshot of the debugging scene by triggering a clock stop. In some examples, control interface 308 can trigger the clock stop while nevertheless excluding host interface 306 such that the clock stop does not apply or impact host interface 306. Additionally, in some examples, control interface 308 can take or initiate the snapshot at least in part by stitching a set of relevant flip-flops into one or more units in order for the results of the stitching to be streamed out (e.g., transmitted across the expansion socket connection and further across the network connection back to the network computing device for debugging purposes).

Scan dump state machine 310 can control a hardware-based scan dump finite state machine to shift out a scan data bitstream, which can result from the stitching together of the relevant flip-flops of the SoC, into a software-visible MMIO map space. Since the total size of the bitstream to be streamed out can be extremely large (e.g., millions or even billions of bits), the shifting action can be looped with a handshake procedure between corresponding software and the hardware-based finite state machine. Of course, although the various components wrapped within isolation wrapper 304 are shown as separate, they can also interface or communicate across an interface or channel 316, an interface or channel 318, and an interface or channel interface 320. Additionally, or alternatively, one or more permutations of these components can be combined as appropriate.

In addition to the components wrapped within isolation wrapper 304, this isolation wrapper itself can provide relevant functionality. In particular, isolation wrapper 304 can isolate the expansion socket host interface logic (corresponding to host interface 306), which operates in mission mode, from a remainder of logic that implements the scan dump, as further discussed above. Isolation wrapper 304 can be helpful because the scan dump operation can itself produce continuous indeterministic states during the shifting process. Moreover, this continuous production of indeterministic states during the shifting process can pollute the expansion socket host interface logic, and furthermore can break the integrity of this logic when interacting with scan dump functionality. Accordingly, the expansion socket configuration space and the corresponding scan dump software interface can be kept alive and intact according to the technology of this application and consistent with FIG. 3 due to the usage of isolation wrapper 304.

Schematic diagram 300 further illustrates an example of how isolation wrapper 304 can address the problem of indeterministic states caused as part of the scan dump operation. The flip-flops chain 314 can shift out (e.g., in a chain) from scan dump component 312 at a step 322, and shift in scan dump component 312 at a step 324 consistent with a shift enable signal 326 and a shift clock 328. The results of the shifting operations can produce a result at a step 330 that is potentially indeterministic (e.g., illustrated as "XXXXXXXXXXXXXX" or "Unknown" in FIG. 3). Consistent with a protect enable signal 334, the results of step 330 can be combined or processed together with safe states 332 to provide input that is protected with safe values to host interface 306 at step 336. At the same time, isolation wrapper 304 can enable consistent and continuous usage of a mission mode interface of the peripheral device as indicated by indicator 338.

Returning to FIG. 2, to support the capability to perform debugging remotely through a network connection network (see network 204), an interactive debugging software can be developed according to the peripheral device's debugging capability, including the scan dump feature. This software can be installed on the remote debugging host (see FIG. 2). In some examples of manual or non-automated debugging or remediation procedures, a user at the network computing device can interact with the debugging tool software to perform programming steps to initiate or command the scan dump. Similarly, the debugging tool software can thereby analyze the shifted scan bitstream accordingly. In these examples, read and/or write operations to the network computing device can be packetized into network transactions, which can have predefined packet formats that further designate debugging commands, and which can be sent over the network connection to the base CPU platform and/or peripheral device undergoing debugging.

As first alluded to above, base CPU platform 206 can include driver 208, which can decode and/or translate debugging command packets that were received at a corresponding network adapter. The driver can furthermore translate the debugging command packets received on the network adapter into transactions formatted for MMIO communications with the peripheral device. Additionally, and from a security perspective, in some examples debugging or testing features can be disabled during a production phase such that a peripheral device under debugging can benefit from trusted firmware or operating system functionality to provide a secure unlocking service and thereby authenticate and open up associated debugging capabilities. In some examples, driver 208 can be implemented at a kernel level of the operating system in case one or more other levels (e.g., higher or more abstracted levels) of the operating system have become at least partially inhibited or compromised due to the failure triggering the debugging process. More generally, when an operating system at the base CPU platform has experienced or been impacted by a failure that at least partially inhibited performance of debugging at the base CPU platform, then method 100 can enable remote debugging such that the failure at the base CPU platform is bypassed or overcome.

In summary, the technology of this application can achieve a number of benefits or advantages. This technology realizes a powerful, convenient, and software-friendly debugging method to perform a debugging scan dump over a network connection and expansion socket connection. Moreover, the technology of this application can perform the scan dump using a host interface without necessarily involving another platform debugging utility. Furthermore, the technology of this application can enable remote debugging, which can overcome obstacles when a failure has made local debugging impossible or inconvenient, etc. The ability to perform remote debugging can be useful for debugging scenarios where the original failure has caused the base CPU platform to experience a soft lock, blue screen, or other obstacle.

The technology of this application can also include features that improve upon related methodologies. For example, some related methodologies can involve performing a remote scan dump operation, but doing so using an extra physical debugging utility that is hooked up to the peripheral device undergoing debugging procedures, in which case the debugging procedures can be performed in-band. Generally speaking, the scan dump procedure according to these methodologies can involve the inconvenience of a physical connection to JTAG connectors and/or other slow speed interfaces that have been repurposed as test ports.

Figure 4:
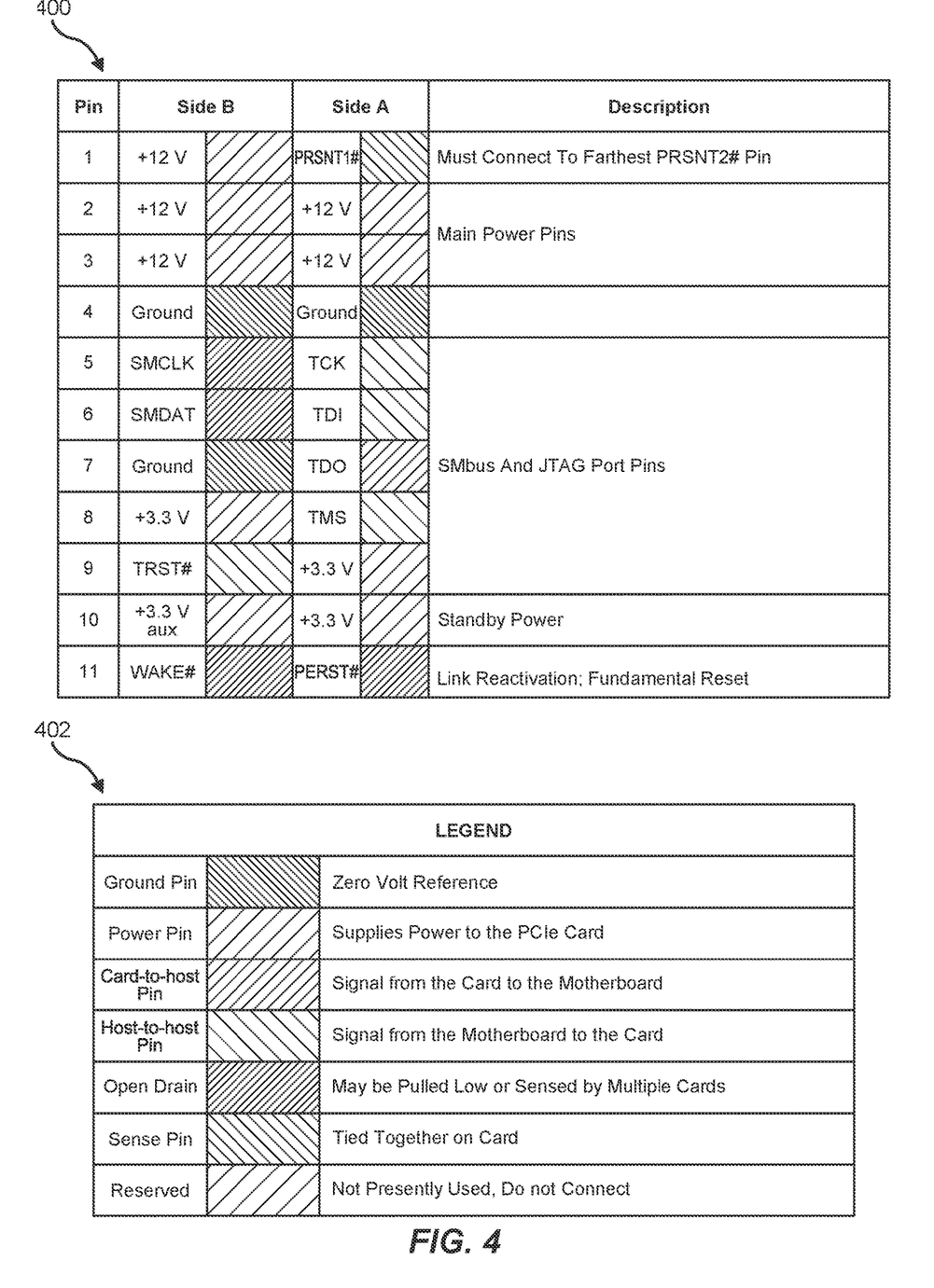
FIG. 4 shows example pins for a PCIe expansion socket.

Simply by way of example and illustration, FIG. 4 further shows pin assignments 400 and a corresponding legend 402 for the PCIe bus, although in other examples a different expansion socket standard can be used. As further shown in this figure, pins 5-9 are reserved for SMbus ("System Management Bus") and JTAG communications. Thus, in a related methodology, debugging procedures can be performed over these pins in a manner compliant with JTAG standards, and yet usage of JTAG can suffer from disadvantages, including those outlined above. More generally, in some examples, the expansion socket of step 102 can be formatted according to a high-speed serial computer expansion bus standard, and PCIe is just one illustrative example of such a bus standard.

Figure 5:
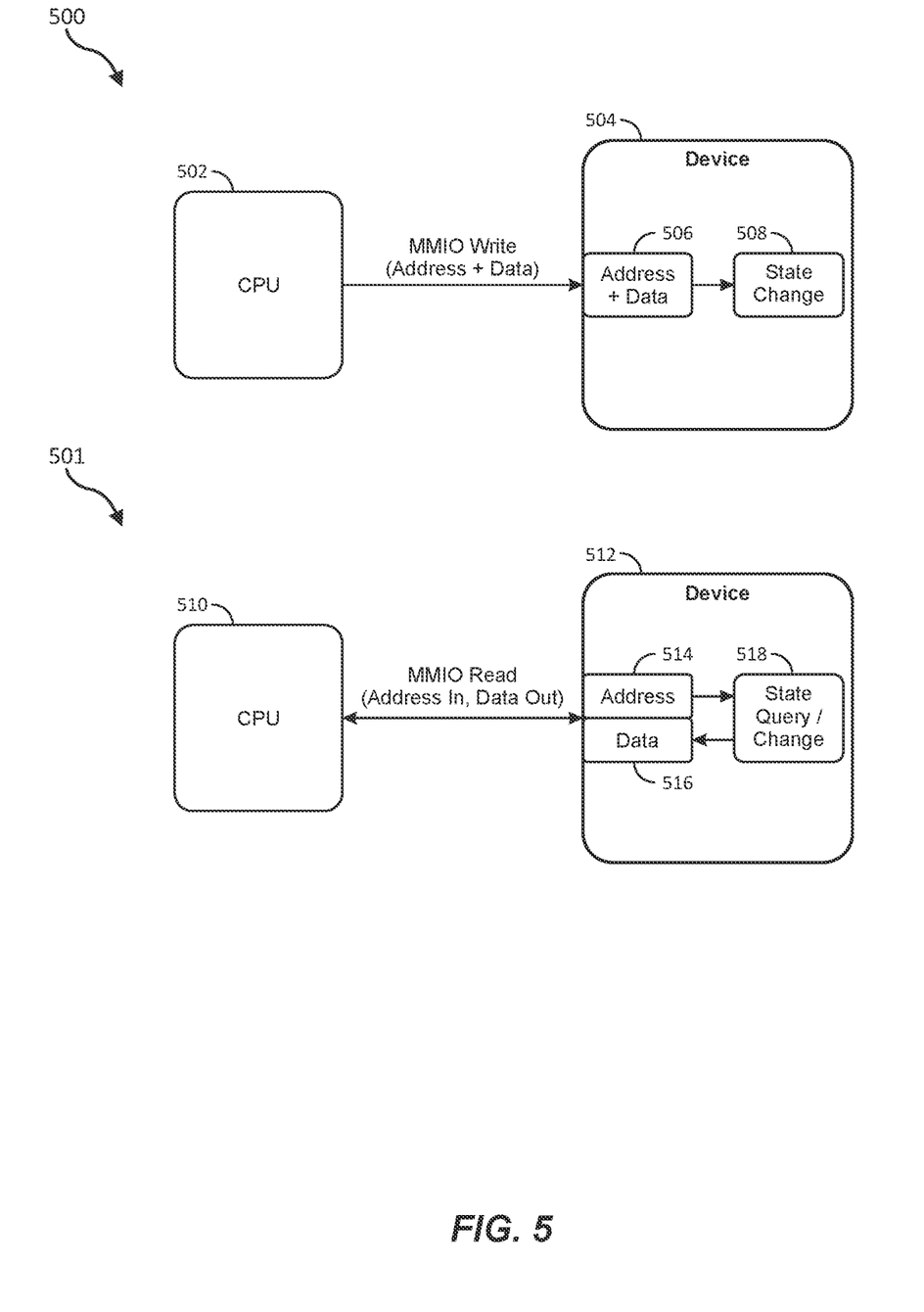
FIG. 5 shows example memory-mapped input/output workflows.

By way of background, FIG. 5 shows an example workflow 500 and workflow 501 that help describe the usage and operation of memory-mapped input/output. Memory-mapped input/output can offer both read and/or write operations. In some examples, memory-mapped input/output writes are used for one-way communication. This can cause the device to change its state, as shown in workflow 500, which features a CPU 502 communicating with a device 504 to communicate at a step 506 and change a state of the device at a step 508. As further shown in this figure, the memory-mapped input/output write operation transmits the data and also a portion of the address to the device. The device uses both quantities to determine how it should change its state.

In further examples, memory-mapped input/output reads are used for two-way communication. This can cause the device the device to return a value based on its current state (see workflow 501). In these examples, the memory-mapped input/output read operation sends a portion of the address to the device, and the device can then use this to determine how to query its state and compute a return value, which can correspond to data 516. In further examples, the device can also change its state, at a step 518, based on the read operation. For instance, the memory-mapped input/output read operation that reads one character from a serial input device can also remove that character from the device's internal queue.

As discussed above, the systems described herein can relate to one or more physical processors such as an SoC. More generally, the physical processor represents any type or form of hardware-implemented processing unit capable of interpreting and/or executing computer-readable instructions. In one example, the physical processor can access and/or modify one or more of modules stored in memory. Additionally or alternatively, the physical processor can execute one or more logical, firmware, and/or software modules to facilitate method 100. Examples of the physical processor include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, or any other suitable physical processor.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example systems described herein can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In some examples, all or a portion of example systems described herein can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method for enabling debugging, the method comprising:
   receiving, at a peripheral device connected through an expansion socket to a base CPU platform, a scan dump instruction from a network computing device connected to the base CPU platform across a network connection; and
   executing, by a System-on-Chip at the peripheral device in response to the scan dump instruction, a debugging procedure that comprises:
      capturing a snapshot of memory of the peripheral device using a control interface of the peripheral device; and
      transmitting the snapshot to the network computing device through memory addresses that have been assigned to memory-mapped input/output.

2. The method of claim 1, wherein capturing the snapshot comprises stitching flip-flops into a chain.

3. The method of claim 1, wherein:
   an operating system at the base CPU platform has experienced a failure that at least partially inhibits performance of debugging at the base CPU platform; and
   the debugging procedure enables remote debugging to bypass the failure at the base CPU platform.

4. The method of claim 1, wherein the expansion socket is formatted according to a high-speed serial computer expansion bus standard.

5. The method of claim 4, wherein the high-speed serial computer expansion bus standard comprises Peripheral Component Interconnect Express.

6. The method of claim 1, wherein usage of the memory addresses that have been assigned to memory-mapped input/output bypasses Joint Test Action Group port pins.

7. The method of claim 1, wherein the peripheral device remains in mission mode throughout the capturing and transmitting of the snapshot.

8. The method of claim 1, wherein:
   the network computing device comprises a remote CPU platform; and
   the network connection comprises an Ethernet connection.

9. The method of claim 1, wherein the System-on-Chip at the peripheral device performs the capturing and the transmitting in coordination with a kernel-mode debugging driver installed on the base CPU platform.

10. The method of claim 1, wherein the System-on-Chip flushes, in response to the scan dump instruction, a set of pending transactions in a host interface of the peripheral device.

11. A System-on-Chip comprising:
    a host interface that receives a scan dump instruction from a network computing device connected to a base CPU platform across a network connection; and
    a control interface that captures, in response to the scan dump instruction, a snapshot of memory of a peripheral device that is connected to the base CPU platform through an expansion socket;
    wherein the host interface further transmits the snapshot to the network computing device through memory addresses that have been assigned to memory-mapped input/output.

12. The System-on-Chip of claim 11, wherein the control interface captures the snapshot by stitching flip-flops into a chain.

13. The System-on-Chip of claim 11, wherein a debugging procedure enables remote debugging to bypass a failure at the base CPU platform.

14. The System-on-Chip of claim 11, wherein the expansion socket is formatted according to a high-speed serial computer expansion bus standard.

15. The System-on-Chip of claim 14, wherein the high-speed serial computer expansion bus standard comprises Peripheral Component Interconnect Express.

16. The System-on-Chip of claim 11, wherein the host interface uses memory addresses that have been assigned to memory-mapped input/output such that the host interface bypasses Joint Test Action Group port pins.

17. The System-on-Chip of claim 11, wherein the System-on-Chip is configured such that the peripheral device remains in mission mode throughout the capturing and transmitting of the snapshot.

18. The System-on-Chip of claim 11, wherein:
    the network computing device comprises a remote CPU platform; and
    the network connection comprises an Ethernet connection.

19. The System-on-Chip of claim 11, wherein the System-on-Chip performs the capturing and the transmitting in coordination with a kernel-mode debugging driver installed on the base CPU platform.

20. A system comprising:
- a base CPU platform connected to a network computing device across a network connection; and
- a peripheral device connected through an expansion socket to the base CPU platform;

wherein:
- the peripheral device comprises a host interface configured to receive a scan dump instruction from the network computing device;
- the peripheral device comprises a control interface configured to capture, in response to the scan dump instruction, a snapshot of memory of the peripheral device; and
- the host interface is further configured to transmit the snapshot to the network computing device through memory addresses that have been assigned to memory-mapped input/output.

* * * * *